United States Patent
Lyu et al.

(10) Patent No.: US 9,824,476 B2
(45) Date of Patent: Nov. 21, 2017

(54) METHOD FOR SUPERPOSING LOCATION INFORMATION ON COLLAGE, TERMINAL AND SERVER

(71) Applicant: TENCENT TECHNOLOGY (SHENZHEN) COMPANY LIMITED, Shenzhen, Guangdong (CN)

(72) Inventors: Shutian Lyu, Guangdong (CN); Da Yao, Guangdong (CN); Zijun Zhang, Guangdong (CN); Fangmai Zheng, Guangdong (CN); Xueqin He, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/113,601

(22) PCT Filed: May 25, 2015

(86) PCT No.: PCT/CN2015/079672
§ 371 (c)(1),
(2) Date: Jul. 22, 2016

(87) PCT Pub. No.: WO2015/180596
PCT Pub. Date: Dec. 3, 2015

(65) Prior Publication Data
US 2017/0124744 A1    May 4, 2017

(30) Foreign Application Priority Data
May 26, 2014    (CN) .......................... 2014 1 0226173

(51) Int. Cl.
*G06T 11/60*    (2006.01)

(52) U.S. Cl.
CPC .......... *G06T 11/60* (2013.01); *G06T 2200/32* (2013.01)

(58) Field of Classification Search
None
See application file for complete search history.

(56) References Cited

U.S. PATENT DOCUMENTS

2008/0174676 A1* 7/2008 Squilla .............. G06F 17/30056
348/231.6
2008/0205789 A1    8/2008 Ten Kate et al.
(Continued)

FOREIGN PATENT DOCUMENTS

| CN | 101111841 A | 1/2008 |
| CN | 103377202 A | 10/2013 |

OTHER PUBLICATIONS

International Search Report and Written Opinion of the ISA for PCT/CN2015/079672, ISA/CN, Haidian District, Beijing, dated Aug. 24, 2015.
(Continued)

*Primary Examiner* — Tize Ma
(74) *Attorney, Agent, or Firm* — Harness, Dickey & Pierce, P.L.C.

(57) ABSTRACT

A method for superposing location information on a collage includes: acquiring a selected image and a collage template identifier corresponding to a selected collage template, and acquiring longitude and latitude information corresponding to the selected image; sending the longitude and latitude information and the collage template identifier to a server; and receiving graphic and textual information returned by the server, and superposing the selected image and the graphic and textual information on the selected collage template.

6 Claims, 5 Drawing Sheets

(56) References Cited

U.S. PATENT DOCUMENTS

2008/0222560 A1    9/2008  Harrison
2012/0321217 A1   12/2012  Cok et al.
2014/0010450 A1*  1/2014  Suwa .................. G06K 9/00281
                                                          382/173
2015/0193409 A1*  7/2015  Portnoy .................. G06F 17/24
                                                          715/202

OTHER PUBLICATIONS

Korean Office Action for Application No. 10-2016-7035687 dated Aug. 18, 2017, and its English translation thereof.

* cited by examiner

METHOD FOR SUPERPOSING LOCATION INFORMATION ON COLLAGE, TERMINAL AND SERVER

FIELD OF THE TECHNOLOGY

The present disclosure relates to the field of Internet technologies, and in particular, to a method for superposing location information on a collage, a terminal, and a server.

BACKGROUND OF THE DISCLOSURE

With the rapid development of science and technology nowadays, more and more people choose to use terminals to take pictures, for example, use mobile phones to take photos. Usually, a camera application program on a terminal has some built-in collage templates, and a user may superpose a taken picture onto a selected collage template, to obtain a collage, so as to acquire a beautified image based on the picture taken. After superposing the picture on the collage template to obtain the collage, usually, the user further needs to superpose related location information on the collage, and therefore, the way the location information is superposed on the collage is a key to improving shooting experience of the user.

A method for superposing location information on a collage is provided in the related technology. In this method, a terminal stores graphic and textual information locally in advance, where the graphic and textual information includes graphs, location information, textual description information, and the like; after an image and a collage template selected by the a user are acquired, the image selected by the user is superposed on the collage template to obtain a collage, and graphic and textual information stored in advance is superposed on the collage. The superposed graphic and textual information includes location information stored locally, and each time location information is superposed on a collage, graphic and textual information stored locally in advance is used.

Because graphic and textual information used in each superposition of location information on a collage is graphic and textual information stored locally in advance, memory space of a terminal is occupied, and there are few patterns of information for superposition, which leads to a limited amount of information superposed on a collage and a poor information superposition effect.

SUMMARY

According to a first aspect, a method for superposing location information on a collage is provided, including:

acquiring a selected image and a collage template identifier corresponding to a selected collage template, and acquiring longitude and latitude information corresponding to the selected image, each collage template corresponding to one collage template identifier;

sending the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location; and receiving the graphic and textual information returned by the server, and superposing the selected image and the graphic and textual information on the selected collage template.

According to a second aspect, a method for superposing location information on a collage is provided, including:

receiving longitude and latitude information and a collage template identifier that are sent by a terminal, the longitude and latitude information being longitude and latitude information corresponding to a selected image acquired by the terminal, and the collage template identifier being a collage template identifier corresponding to a selected collage template acquired by the terminal;

generating corresponding graphic and textual information according to the longitude and latitude information and the collage template identifier, the graphic and textual information including textual information and graphic information that are related to a location; and sending the graphic and textual information to the terminal, so that the terminal superposes the selected image and the graphic and textual information on the selected collage template.

According to a third aspect, a terminal is provided, including:

a first acquiring module, configured to acquire a selected image and a collage template identifier corresponding to a selected collage template, each collage template corresponding to one collage template identifier;

a second acquiring module, configured to acquire longitude and latitude information corresponding to the selected image;

a sending module, configured to send the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location;

a receiving module, configured to receive the graphic and textual information returned by the server; and a superposition module, configured to superpose the selected image and the graphic and textual information on the selected collage template.

According to a fourth aspect, a server is provided, including:

a receiving module, configured to receive longitude and latitude information and a collage template identifier that are sent by a terminal, the longitude and latitude information being longitude and latitude information corresponding to a selected image acquired by the terminal, and the collage template identifier being a collage template identifier corresponding to a selected collage template acquired by the terminal;

a generating module, configured to generate corresponding graphic and textual information according to the longitude and latitude information and the collage template identifier, the graphic and textual information including textual information and graphic information that are related to a location; and a sending module, configured to send the graphic and textual information to the terminal, so that the terminal superposes the selected image and the graphic and textual information on the selected collage template.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions and advantages of the present disclosure more clear, implementation manners of the present disclosure are described in further detail below with reference to the accompanying drawings.

In the related technology, because graphic and textual information used in each superposition of location information on a collage template is graphic and textual information acquired from local memory, memory space of a terminal is occupied and there are few patterns of information for superposition, which leads to a poor information superposition effect.

Figure 1:
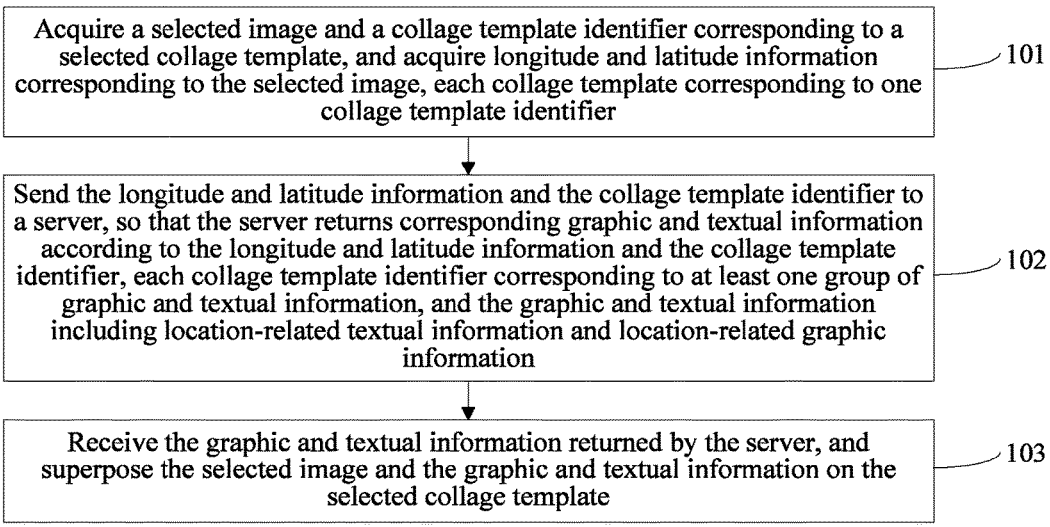
FIG. 1 is a flowchart of a method for superposing location information on a collage according to an exemplary embodiment.

To prevent the foregoing situation and improve the effect of superposing location information on a collage, an embodiment of the present invention provides a method for superposing location information on a collage, where the method is applied to a terminal, and the terminal includes, but is not limited to, a cell phone, a computer, a tablet computer, and the like. Referring to FIG. 1, a process of the method provided by this embodiment includes:

101: Acquire a selected image and a collage template identifier corresponding to a selected collage template, and acquire longitude and latitude information corresponding to the selected image, each collage template corresponding to one collage template identifier.

As an optional embodiment, the acquiring longitude and latitude information corresponding to the selected image includes, but is not limited to:

detecting whether exchangeable image file (exif) information exists in the selected image, the exif information including at least longitude and latitude information of a location at which the selected image is shot;

acquiring, if it is detected that exif information exists in the selected image, the exif information in the selected image, and acquiring the longitude and latitude information corresponding to the selected image according to the exif information; or measuring longitude and latitude information of a current location if it is detected that no exif information exists in the selected image, and using the longitude and latitude information obtained through measurement as the longitude and latitude information corresponding to the selected image.

102: Send the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location.

103: Receive the graphic and textual information returned by the server, and superpose the selected image and the graphic and textual information on the selected collage template.

In the method provided in this embodiment, longitude and latitude information corresponding to an acquired selected image and a collage template identifier corresponding to a selected collage template are sent to a server, and graphic and textual information, which is returned by the server according to the longitude and latitude information and the collage template identifier, and the selected image are superposed on the selected collage template, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

Figure 2:
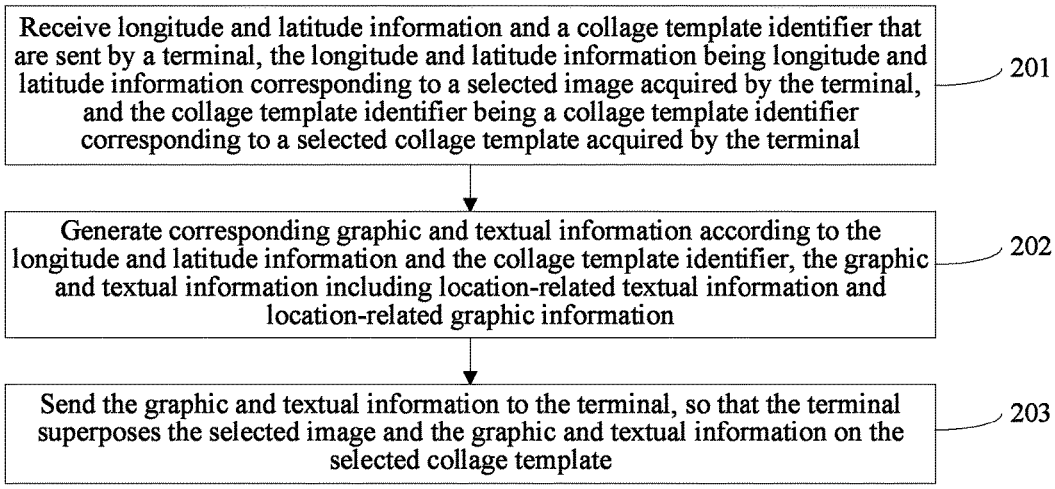
FIG. 2 is a flowchart of a method for superposing location information on a collage according to an exemplary embodiment.

An embodiment of the present invention provides a method for superposing location information on a collage, where the method is applied to a server. With reference to content in the foregoing embodiment, an example is used to describe the method provided by this embodiment. Referring to FIG. 2, a process of the method provided in this embodiment includes:

201: Receive longitude and latitude information and a collage template identifier that are sent by a terminal, the longitude and latitude information being longitude and latitude information corresponding to a selected image acquired by the terminal, and the collage template identifier being a collage template identifier corresponding to a selected collage template acquired by the terminal.

202: Generate corresponding graphic and textual information according to the longitude and latitude information and the collage template identifier, the graphic and textual information including textual information and graphic information that are related to a location.

As an optional embodiment, the generating corresponding graphic and textual information according to the longitude and latitude information and the collage template identifier includes, but is not limited to:

searching for corresponding location information according to the longitude and latitude information; and acquiring, if the location information corresponding to the longitude and latitude information is found, corresponding graphic information according to the collage template identifier and the found location information, and generating corresponding graphic and textual information according to the found location information and the acquired graphic information.

As an optional embodiment, after the searching for corresponding location information according to the longitude and latitude information, the method further includes:

determining default location information and graphic information according to the collage template identifier if the location information corresponding to the longitude and latitude information is not found, and generating corresponding graphic and textual information according to the default location information and graphic information.

203: Send the graphic and textual information to the terminal, so that the terminal superposes the selected image and the graphic and textual information on the selected collage template.

In the method provided in this embodiment, longitude and latitude information and a collage template identifier that are sent by a terminal are received, corresponding graphic and textual information is generated according to the longitude and latitude information and the collage template identifier, and the graphic and textual information is sent to the terminal, so that terminal superposes the selected image and the graphic and textual information on the selected collage template, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

Figure 3:
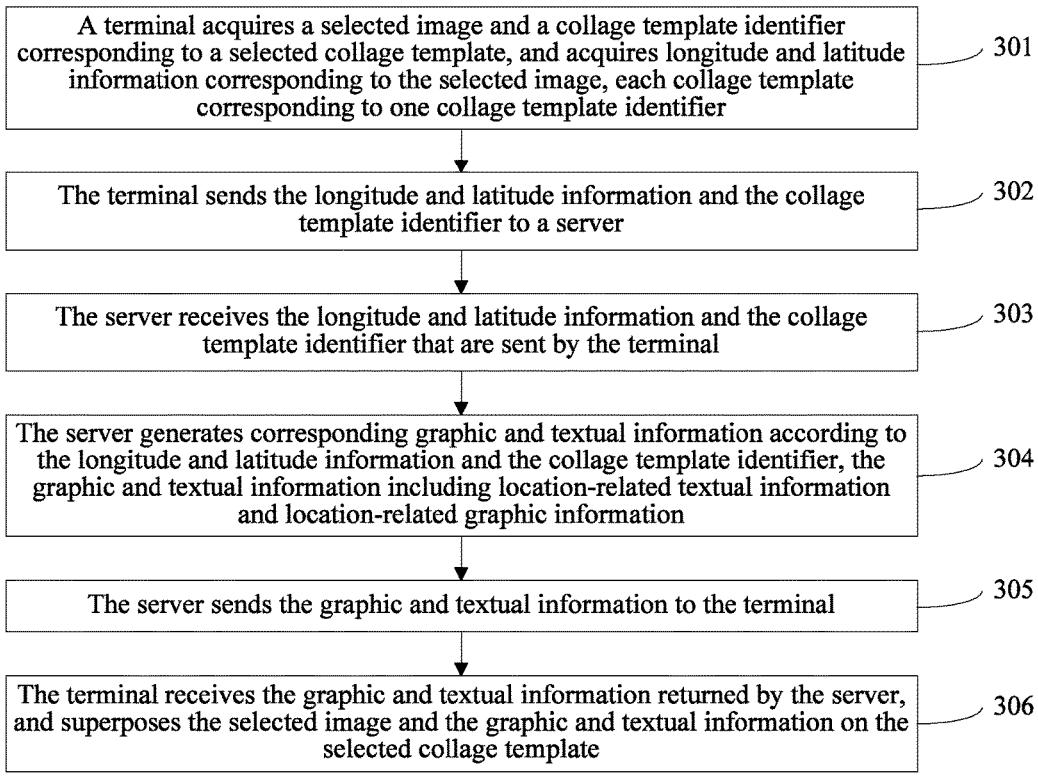
FIG. 3 is a flowchart of a method for superposing location information on a collage according to an exemplary embodiment.

An embodiment of the present invention provides a method for superposing location information on a collage, where the method relates to a terminal and a server. With reference to content in the foregoing embodiment, an example is used to describe the method provided by this embodiment. Referring to FIG. 3, a process of the method provided in this embodiment includes:

301: A terminal acquires a selected image and a collage template identifier corresponding to a selected collage template, and acquires longitude and latitude information corresponding to the selected image, each collage template corresponding to one collage template identifier.

This embodiment does not specifically limit the manner of acquiring, by the terminal, a selected image, which includes, but is not limited to: displaying, in a form of a list, shot images in a current album; detecting a selection operation performed by a user on the displayed image list; and using a detected user-selected image as the selected image.

This embodiment does not specifically the manner of acquiring, by the terminal, a collage template identifier corresponding to a selected collage template, which includes, but is not limited to: storing, by the terminal in advance, at least one collage template and a collage template identifier corresponding to the at least one collage template, where each collage template corresponds to one collage template identifier; displaying, by the terminal, different collage templates in an interface according to patters or categories of the collage templates, and detecting a selection operation performed by the user on the displayed collage templates; acquiring a collage template identifier corresponding to a detected user-selected collage template, and using the acquired collage template identifier as the collage template identifier corresponding to the selected collage template. Each collage template identifier corresponds to at least one group of graphic and textual information, which is not specifically limited in this embodiment.

The manner of acquiring, by the terminal, longitude and latitude information corresponding to the selected image is not specifically limited in this embodiment, which includes, but is not limited to: detecting whether exif information exists in the selected image; if it is detected that exif information exists in the selected image, acquiring the exif information in the selected image, and acquiring the longitude and latitude information corresponding to the selected image according to the exif information; or if it is detected that no exif information exists in the selected image, measuring longitude and latitude information of a current location, and using the longitude and latitude information obtained through measurement as the longitude and latitude information corresponding to the selected image. The exif information includes at least longitude and latitude information of a location at which an image is shot, and this embodiment does not specifically limit content in the exif information.

When it is detected that no exif information exists in the selected image, because a positioning component is generally configured in the terminal, the positioning component may be used to measure longitude and latitude information of a current location, and the longitude and latitude information obtained through measurement may be used as the longitude and latitude information corresponding to the selected image.

302: The terminal sends the longitude and latitude information and the collage template identifier to a server.

After acquiring the longitude and latitude information and the collage template identifier through step 301, the terminal may send the acquired longitude and latitude information and collage template identifier to a server. The terminal may send the longitude and latitude information and the collage template identifier to the server by means of network transmission, and this embodiment does not specifically limit the manner of sending, by the terminal, the longitude and latitude information and the collage template identifier to a server.

303: The server receives the longitude and latitude information and the collage template identifier that are sent by the terminal.

After the terminal sends the longitude and latitude information and the collage template identifier to the server through step 302, the server may receive the longitude and latitude information and the collage template identifier that are sent by the terminal In addition, because corresponding graphic and textual information needs to be determined subsequently according to the longitude and latitude information and the collage template identifier, the server may store the received longitude and latitude information and collage template identifier, and this embodiment does not limit a specific storage manner.

304: The server generates corresponding graphic and textual information according to the longitude and latitude information and the collage template identifier, the graphic and textual information including textual information and graphic information that are related to a location.

This embodiment does not specifically limit the manner of generating, by the server, corresponding graphic and textual information according to the longitude and latitude information and the collage template identifier, which includes, but is not limited to: searching for corresponding location information according to the longitude and latitude information; if the location information corresponding to the longitude and latitude information is found, acquiring corresponding graphic information according to the collage template identifier and the found location information, and generating corresponding graphic and textual information according to the found location information and the acquired graphic information; or if the location information corresponding to the longitude and latitude information is not found, determining default location information and graphic information according to the collage template identifier, and generating corresponding graphic and textual information according to the default location information and graphic information.

The manner of searching for corresponding location information according to the longitude and latitude information is not specifically limited in this embodiment either, which includes, but is not limited to: storing, by the server in advance, a database including longitude and latitude information and corresponding location information, and searching the database for corresponding location information according to the longitude and latitude information.

For example, the longitude and latitude information is 39.9 degrees north latitude and 116.3 degrees east longitude, and according to the longitude and latitude information, it may be determined in the database stored in advance that the corresponding location information is city A.

In addition, different collage templates correspond to different collage template types, and different collage template identifiers correspond to different collage templates. For example, some collage templates correspond to a collage template type "travel", some collage templates correspond to a collage template type "food", and all these collage templates have different corresponding collage template identifiers. Therefore, while storing in advance the database that includes longitude and latitude information and corresponding location information, the server may also store a database that includes collage template identifiers and types of corresponding collage templates, so that a type of a corresponding collage template can be conveniently determined according to the collage template identifier subsequently, which is not specifically limited in this embodiment.

When the location information corresponding to the longitude and latitude information is found, corresponding graphic information may be acquired according to the collage template identifier and the found location information. This embodiment does not specifically limit the manner of acquiring corresponding graphic information according to the collage template identifier and the found location information, which includes, but is not limited to: determining a type of a collage template corresponding to the collage template identifier; and acquiring corresponding graphic information according to the type of the collage template and the found location information. The type of the collage template includes, but is not limited to, travel, food, entertainment, or the like. For example, when the type of the collage template is travel, the corresponding graphic information may be graphic information of a scenic spot; when the type of the collage template is food, the corresponding graphic information may be graphic information of food; and when the type of the collage template is entertainment, the corresponding graphic information may be graphic information of a club. Besides, there may be other collage types, and this embodiment does not specifically limit the collage types.

Using an example in which the found location information is city A, and the type of the collage template corresponding to the collage template identifier is "travel", when it is determined that the type of the collage template corresponding to the collage template identifier is "travel", because scenic spot B is the only scenic spot in the found location information, it can be determined that a current location of the user is scenic spot B, and therefore, it can be determined that the corresponding graphic information is a related picture of scenic spot B.

After the corresponding graphic information is acquired according to the collage template identifier and the found location information, corresponding graphic and textual information may be generated according to the found location information and the acquired graphic information, and this embodiment does not specifically limit content of the generated graphic and textual information, which includes, but is not limited to: textual information related to a location and graphic information related to a location. The graphic information related to a location may be the acquired graphic information, and the textual information related to a location may include textual information corresponding to a location name and textual description information related to the location name.

When the location information corresponding to the longitude and latitude information is not found, default location information and graphic information may be determined according to the collage template identifier. The default location information may be location information stored on a server side. For example, textual information like "unknown position" may be used as the default location information, and each collage template may correspond to different location information, or textual information corresponding to the longitude and latitude information in this step may be used as the location information; this embodiment does not specifically limit content of the default location information. The default graphic information is graphic information stored on the server side, and each collage template identifier corresponds to a group of default graphic information. After the default location information and graphic information are determined according to the collage template identifier, corresponding graphic and textual information may be generated according to the default location information and graphic information, and this embodiment does not specifically limit content of the generated graphic and textual information, which includes: but is not limited to: textual information and graphic information that are related to the default location in the foregoing process.

It should be noted that, in a case in which the location information corresponding to the longitude and latitude information is found, because the corresponding graphic information needs to be determined according to the type of the collage template and the found location information, and in the case of a same collage template type, different location information corresponds to different graphic information. For example, when the type of the collage template is "travel", different scenic spots may be determined according to the location information, and therefore, different graphic information corresponding the scenic spots is determined. Therefore, apart from the default graphic information, each collage template identifier corresponds to at least one group of graphic information, and this embodiment does not specifically limit the number of graphic information groups corresponding to each collage template identifier.

In addition, in the related technology, a database is stored on the terminal, and the database stored on the terminal can acquire data from the server side and be updated according to the acquired data only when a network connection is provided. When the server side has update data and before the terminal has time to update the locally stored database, data acquired by the terminal from the locally stored database is data out of date and is inaccurate. In the method provided in this embodiment, with this step, the server searches for corresponding location information according to the longitude and latitude information and generates corresponding graphic and textual information, which avoids storing a database on the terminal and that the terminal searches for corresponding location information from the locally stored database according to the longitude and latitude information; and moreover, it is unnecessary to store graphic and textual information on the terminal, thereby saving limited memory space on the terminal. Besides, the terminal directly acquires data from the database stored on the server side, which ensures that data acquired each time is latest data. Therefore, when corresponding location information is searched for by the server according to the longitude and latitude information, real-time performance and accuracy of the found location information can be ensured.

305: The server sends the graphic and textual information to the terminal.

After acquiring the graphic and textual information through step 304, the server may send the acquired graphic and textual information to the terminal. The server may send the graphic and textual information to the terminal by means of network transmission, and this embodiment does not specifically limit the manner of sending, by the server, the graphic and textual information to the terminal.

306: The terminal receives the graphic and textual information returned by the server, and superposes the selected image and the graphic and textual information on the selected collage template.

After receiving the graphic and textual information returned by the server, the terminal may superpose the selected image and the graphic and textual information on the selected collage template. The selected collage template is the collage template in step 301, which is selected by the user among the displayed collage templates, and the selected image is the user-selected image acquired in step 301. This embodiment does not specifically limit the manner of superposing, by the terminal, the selected image and the graphic and textual information on the selected collage template, which includes, but is not limited to: determining positions for placing the selected image and the graphic and textual information on the selected collage template; and superposing the selected image and the graphic and textual information on the selected collage template according to the determined positions.

Using an example in which the graphic and textual information includes textual information and graphic information that are related to a location, and the location-related textual information includes textual information corresponding to a location name and textual description information related to the location name, a related picture in the graphic information may be used as a background of the collage template, the selected image may be superposed at the middle of the background, the textual information corresponding to the location name may be superposed at the upper left corner of the background, and the textual description information related to the location name may be superposed at the lower right corner of the background.

Figure 10:
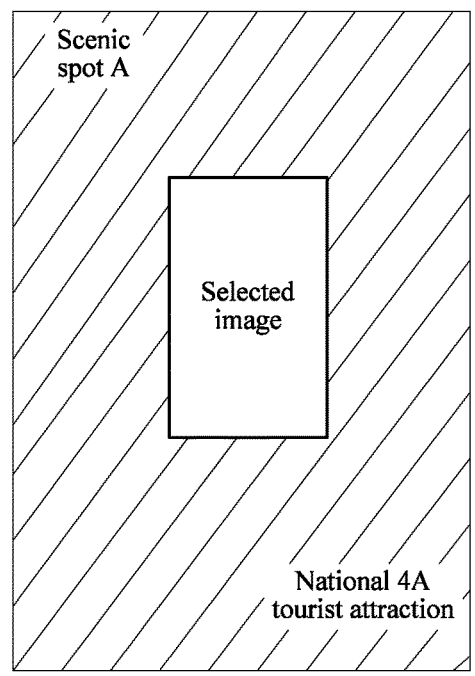
FIG. 10 is a schematic diagram of an effect of superposing location information on a collage according to an exemplary embodiment.

A superposition effect of the foregoing example may be as shown in FIG. 10, and when a related picture in the graphic information is used as the background of the collage template, it may be like the background image shown in FIG. 10. The textual information "scenic spot A" at the upper left corner of FIG. 10 is the textual information corresponding to the location name, the textual information "national 4A tourist attraction" at the lower right corner of FIG. 10 is the textual description information related to scenic spot A, and the superposed selected image is shown at the middle of FIG. 10.

It should be noted that, different collage templates corresponding to different collage styles, and therefore, when the selected image and graphic and textual information are superposed, superposition positions corresponding to different collage templates may be different, and display patterns may also be different, and this embodiment does not specifically limit the superposition position and style corresponding to the collage template.

In addition, after the process of information superposition is finished, the terminal may further display the completed collage in an interface, to feedback a final superposition effect to the user, and the user may choose whether to accept and save the current completed collage, or the user may perform collage again according to the foregoing process if the user is not satisfied with the current collage, which is not specifically limited in this embodiment either.

In the method provided in this embodiment, a terminal sends longitude and latitude information corresponding to an acquired selected image and a collage template identifier corresponding to a selected collage template to a server, and superposes, on the selected collage template, the selected image and graphic and textual information that is returned by the server according to the longitude and latitude information and the collage template identifier, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

Figure 4:
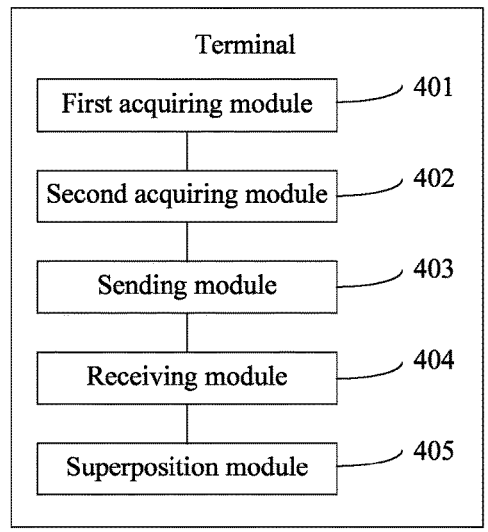
FIG. 4 is a schematic structural diagram of a terminal according to an exemplary embodiment.

An embodiment of the present invention provides a terminal, where the terminal is used to execute the method for superposing location information on a collage provided in the foregoing embodiment. Referring to FIG. 4, the terminal includes:

a first acquiring module 401, configured to acquire a selected image and a collage template identifier corresponding to a selected collage template, each collage template corresponding to one collage template identifier;

a second acquiring module 402, configured to acquire longitude and latitude information corresponding to the selected image;

a sending module 403, configured to send the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location.

a receiving module 404, configured to receive the graphic and textual information returned by the server; and a superposition module 405, configured to superpose the selected image and the graphic and textual information on the selected collage template.

As an optional embodiment, the second acquiring module 402 is configured to detect whether exif information exists in the selected image, the exif information including at least longitude and latitude information of a location at which the selected image is shot; acquire, if it is detected that exif information exists in the selected image, the exif information in the selected image, and acquire the longitude and latitude information corresponding to the selected image according to the exif information; or measure longitude and latitude information of a current location if it is detected that no exif information exists in the selected image, and use the longitude and latitude information obtained through measurement as the longitude and latitude information corresponding to the selected image.

The terminal provided in this embodiment sends, to a server, longitude and latitude information corresponding to an acquired selected image and a collage template identifier corresponding to a selected collage template, and superposes, on the selected collage template, the selected image and graphic and textual information that is returned by the server according to the longitude and latitude information and the collage template identifier, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

An embodiment of the present invention provides a terminal, where the terminal is used to execute the method for superposing location information on a collage in the foregoing embodiment.

Figure 5:
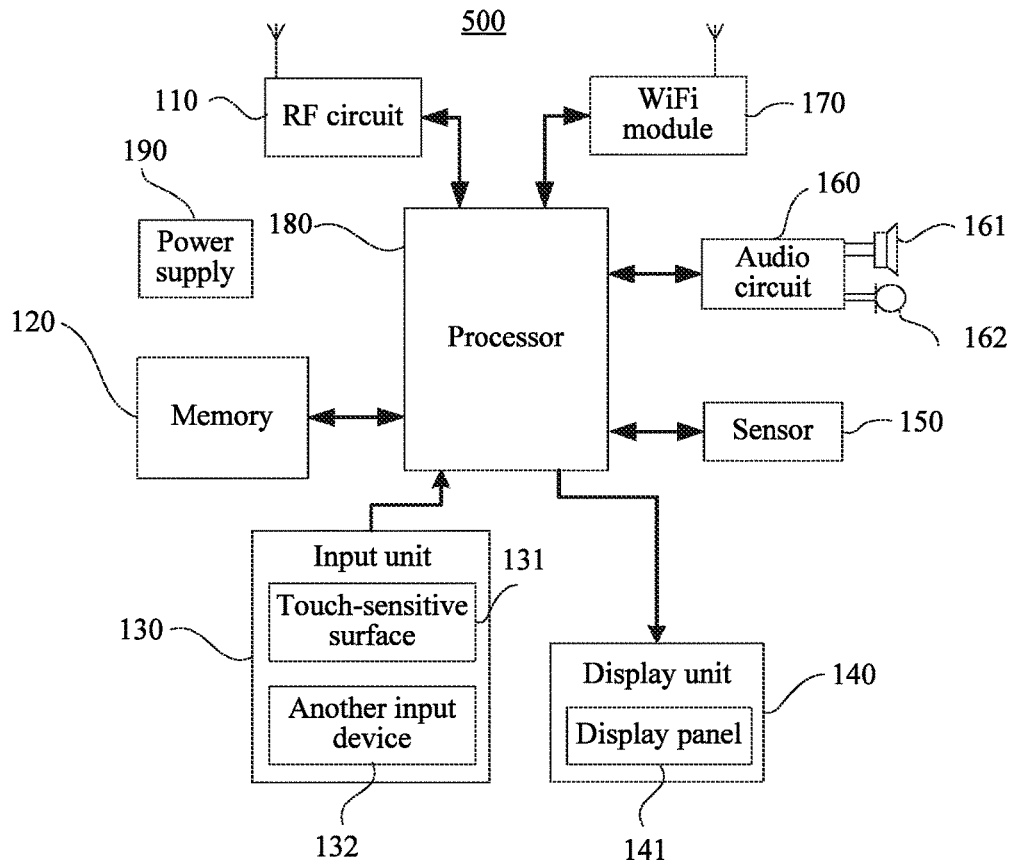
FIG. 5 is a schematic structural diagram of a terminal according to an exemplary embodiment.

Referring to FIG. 5, the terminal 500 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that the structure of the terminal shown in FIG. 5 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 500, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 500. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 500 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 500 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 500, are not further described herein.

The audio circuit 160, a loudspeaker 161, and a microphone 162 may provide audio interfaces between the user and the terminal 500. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 500.

http://baike.baidu.com/view/1524.htm WiFi is a short distance wireless transmission technology. The terminal 500 may help, by using the WiFi module 170, the user to receive and send e-mails, browse a webpage, access streaming media, and so on, which provides wireless broadband Internet access for the user. Although FIG. 5 shows the WiFi module 170, it may be understood that the WiFi module 170 is not a necessary component of the terminal 500, and when required, the WiFi module 170 may be omitted as long as the scope of the essence of the present disclosure is not changed.

The processor 180 is the control center of the terminal 500, and is connected to various parts of the mobile phone by using various interfaces and lines. By running or executing the software program and/or module stored in the memory 120, and invoking data stored in the memory 120, the processor 180 performs various functions and data processing of the terminal 500, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 500 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 500 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs contain instructions used for implementing the following operations:

acquiring a selected image and a collage template identifier corresponding to a selected collage template, and acquiring longitude and latitude information corresponding to the selected image, each collage template corresponding to one collage template identifier;

sending the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location; and receiving the graphic and textual information returned by the server, and superposing the selected image and the graphic and textual information on the selected collage template.

Assuming that the foregoing is a first possible implementation manner, in a second possible implementation manner provided on the basis of the first possible implementation manner, the memory of the terminal further contains instructions for implementing the following operations:

detecting whether exif information exists in the selected image, the exif information including at least longitude and latitude information of a location at which the selected image is shot;

acquiring, if it is detected that exif information exists in the selected image, the exif information in the selected image, and acquiring the longitude and latitude information corresponding to the selected image according to the exif information; or measuring longitude and latitude information of a current location if it is detected that no exif information exists in the selected image, and using the longitude and latitude information obtained through measurement as the longitude and latitude information corresponding to the selected image.

The terminal provided in the present disclosure sends, to a server, longitude and latitude information corresponding to an acquired selected image and a collage template identifier corresponding to a selected collage template, and superposes, on the selected collage template, the selected image and graphic and textual information that is returned by the server according to the longitude and latitude information and the collage template identifier, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

An embodiment of the present invention further provides a computer readable storage medium, where the computer readable medium may be a computer readable storage medium contained in the memory in the foregoing embodiment, or may be a separate computer readable storage medium that is not installed in a terminal. The computer readable storage medium has one or more programs stored therein, and the one or more programs are executed by one or more processors to implement method for superposing location information on a collage, where the method includes:

acquiring a selected image and a collage template identifier corresponding to a selected collage template, and acquiring longitude and latitude information corresponding to the selected image, each collage template corresponding to one collage template identifier;

sending the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location; and receiving the graphic and textual information returned by the server, and superposing the selected image and the graphic and textual information on the selected collage template.

Assuming that the foregoing is a first possible implementation manner, in a second possible implementation manner provided on the basis of the first possible implementation manner, the acquiring longitude and latitude information corresponding to the selected image includes:

detecting whether exif information exists in the selected image, the exif information including at least longitude and latitude information of a location at which the selected image is shot;

acquiring, if it is detected that exif information exists in the selected image, the exif information in the selected image, and acquiring the longitude and latitude information corresponding to the selected image according to the exif information; or measuring longitude and latitude information of a current location if it is detected that no exif information exists in the selected image, and using the longitude and latitude information obtained through measurement as the longitude and latitude information corresponding to the selected image.

In the computer readable storage medium provided in this embodiment of the present invention, longitude and latitude information corresponding to an acquired selected image and a collage template identifier corresponding to a selected collage template are sent to a server, and the selected image and graphic and textual information that is returned by the server according to the longitude and latitude information and the collage template identifier are superposed on the selected collage template. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

An embodiment of the present invention provides a graphical user interface, where the graphical user interface is used on a terminal, and the terminal includes a touch screen display, a memory, and one or more processors for executing one or more programs; the graphical user interface includes:

acquiring a selected image and a collage template identifier corresponding to a selected collage template, and acquiring longitude and latitude information corresponding to the selected image, each collage template corresponding to one collage template identifier;

sending the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location; and receiving the graphic and textual information returned by the server, and superposing the selected image and the graphic and textual information on the selected collage template.

The user graphical interface provided in this embodiment of the present invention sends, to a server, longitude and latitude information corresponding to an acquired selected image and a collage template identifier corresponding to a selected collage template, and superposes, on the selected collage template, the selected image and graphic and textual information that is returned by the server according to the longitude and latitude information and the collage template identifier, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

Figure 6:
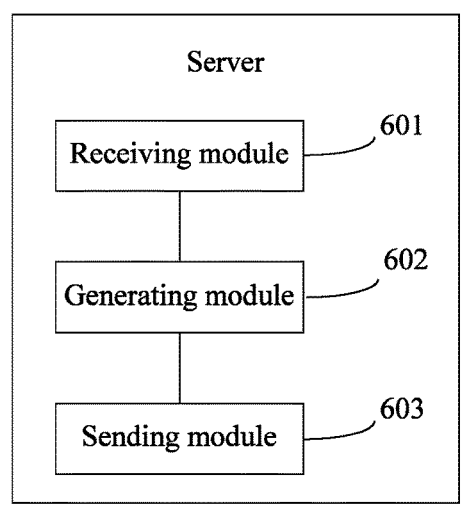
FIG. 6 is a schematic structural diagram of a server according to an exemplary embodiment.

An embodiment of the present invention provides a server, where the server is used to execute the method for superposing location information on a collage provided in the foregoing embodiment. Referring to FIG. 6, the server includes:

a receiving module 601, configured to receive longitude and latitude information and a collage template identifier that are sent by a terminal, the longitude and latitude information being longitude and latitude information corresponding to a selected image acquired by the terminal, and the collage template identifier being a collage template identifier corresponding to a selected collage template acquired by the terminal;

a generating module 602, configured to generate corresponding graphic and textual information according to the longitude and latitude information and the collage template identifier, the graphic and textual information including textual information and graphic information that are related to a location; and a sending module 603, configured to send the graphic and textual information to the terminal, so that the terminal superposes the selected image and the graphic and textual information on the selected collage template.

Figure 7:
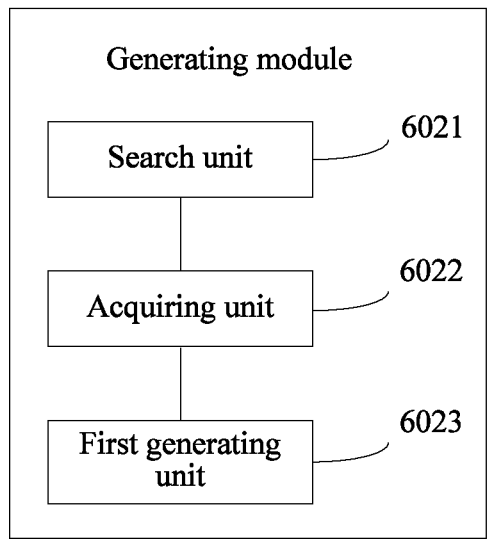
FIG. 7 is a schematic structural diagram of a generating module according to an exemplary embodiment.

As an optional embodiment, referring to FIG. 7, the generating module 602 includes, but is not limited to:

a search unit 6021, configured to search for corresponding location information according to the longitude and latitude information;

an acquiring unit 6022, configured to acquire, when the location information corresponding to the longitude and latitude information is found, corresponding graphic information according to the collage template identifier and the found location information; and a first generating unit 6023, configured to generate corresponding graphic and textual information according to the found location information and the acquired graphic information.

Figure 8:
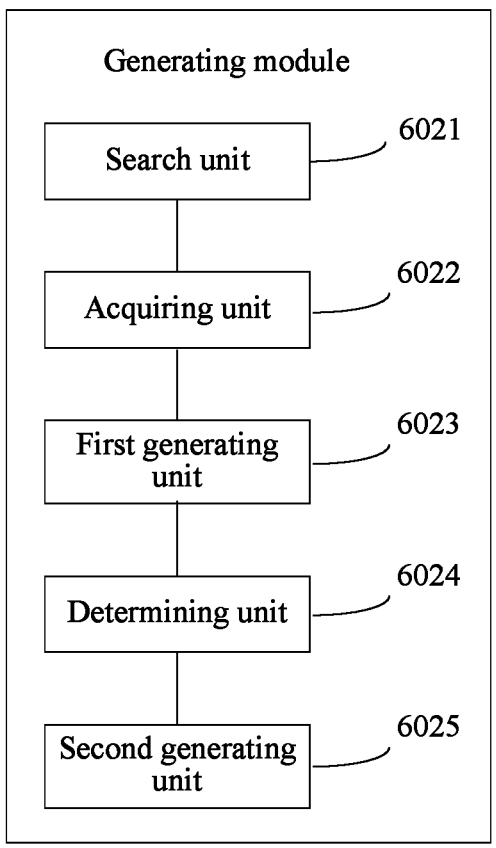
FIG. 8 is a schematic structural diagram of a generating module according to an exemplary embodiment.

As an optional embodiment, referring to FIG. 8, the generating module 602 further includes:

a determining unit 6024, configured to determine default location information and graphic information according to the collage template identifier when the location information corresponding to the longitude and latitude information is not found; and a second generating unit 6025, configured to generate corresponding graphic and textual information according to the default location information and graphic information.

The server provided in this embodiment receives longitude and latitude information and a collage template identifier that are sent by a terminal, generates corresponding graphic and textual information according to the longitude and latitude information and the collage template identifier, and sends the graphic and textual information to the terminal, so that terminal superposes the selected image and the graphic and textual information on the selected collage template, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

Figure 9:
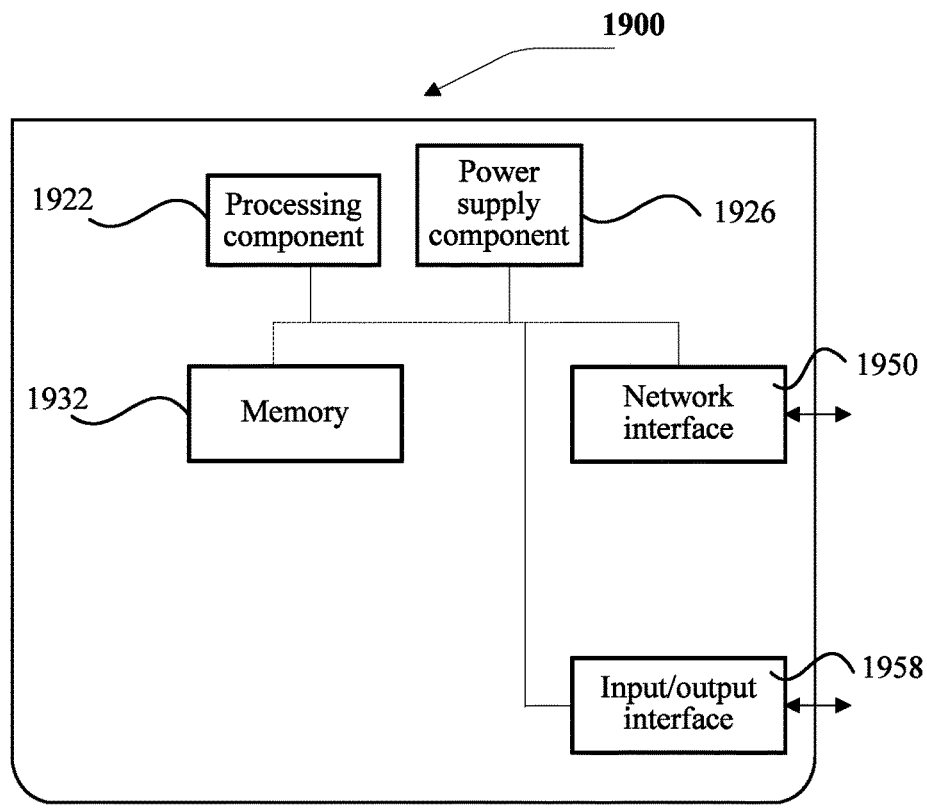
FIG. 9 is a schematic structural diagram of a server according to an exemplary embodiment.

FIG. 9 is a block diagram of a server 1900 according to an exemplary embodiment. For example, the server 1900 may be provided as a server. Referring to FIG. 9, the server 1900 includes a processing component 1922, and further includes one or more processors and a memory resource that is represented by a memory 1932, where the memory 1932 is configured to store instructions that can be executed by the processing component 1922, for example, an application program. The application program stored in the memory 1932 may include one or more modules, where each module corresponds to a group of instructions. In addition, the processing component 1922 is configured to execute instructions, so as to execute the foregoing method.

The server 1900 may further include a power supply component 1926, configured to execute power supply management of the server 1900, a wired or wireless network interface 1950, configured to connect the server 1900 to a network, and an input/output (I/O) interface 1958. The server 1900 may operate an operating system that is stored in the memory 1932, for example, Windows Server™, Mac OS X™, Unix™, Linux™, FreeBSD™, or the like.

The server provided in this embodiment receives longitude and latitude information and a collage template identifier that are sent by a terminal, generates corresponding graphic and textual information according to the longitude and latitude information and the collage template identifier, and sends the graphic and textual information to the terminal, so that terminal superposes the selected image and the graphic and textual information on the selected collage template, thereby implementing superposition of information on a collage. Because the graphic and textual information is returned by the server, it does not need to occupy memory space of the terminal; besides, because the server stores graphic and textual information of many patterns, many patterns of information are available for superposition on a collage, and therefore, a desirable information superposition effect is achieved.

It should be noted that the division of above functional modules is only described for exemplary purposes when the terminal provided in the foregoing embodiment superposes location information on a collage. In actual applications, the functions may be allocated to different functional modules according to specific needs, which means that the internal structure of the apparatus is divided to different functional modules to complete all or some of the above described functions. In addition, the terminal and server provided by the foregoing embodiments are based on the same concept as the method for superposing location information on a collage. For the specific implementation process, refer to the method embodiments, and the details are not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for superposing location information on a collage, comprising:
    acquiring, by a terminal, a selected image and a collage template identifier corresponding to a selected collage template, and acquiring, by the terminal, longitude and latitude information corresponding to the selected image, each collage template corresponding to one collage template identifier;
    sending, by the terminal, the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location, and the textual information includes textual information corresponding to a location name and textual description information related to the location name; and
    receiving, by the terminal, the graphic and textual information returned by the server, and superposing, by the terminal, the selected image and the graphic and textual information on the selected collage template;
    wherein the acquiring longitude and latitude information corresponding to the selected image includes:
    detecting whether exchangeable image file (exif) information exists in the selected image, the exif information including at least longitude and latitude information of a location at which the selected image is shot;
    acquiring, if it is detected that exif information exists in the selected image, the exif information in the selected image, and acquiring the longitude and latitude information corresponding to the selected image according to the exif information; or measuring longitude and latitude information of a current location if it is detected that no exif information exists in the selected image, and using the longitude and latitude information obtained through measurement as the longitude and latitude information corresponding to the selected image.

2. A method for superposing location information on a collage, comprising:

receiving longitude and latitude information and a collage template identifier that are acquired and sent by a terminal, the longitude and latitude information being longitude and latitude information corresponding to a selected image acquired by the terminal, and the collage template identifier being a collage template identifier corresponding to a selected collage template acquired by the terminal;

generating corresponding graphic and textual information according to the longitude and latitude information and the collage template identifier, the graphic and textual information including textual information and graphic information that are related to a location, and the textual information includes textual information corresponding to a location name and textual description information related to the location name; and sending the graphic and textual information to the terminal, so that the terminal superposes the selected image and the graphic and textual information on the selected collage template;

wherein generating the corresponding graphic and textual information includes:

searching for corresponding location information according to the longitude and latitude information; and acquiring, if the location information corresponding to the longitude and latitude information is found, the corresponding graphic information according to the collage template identifier and the found location information, and generating the corresponding graphic and textual information according to the found location information and the acquired graphic information.

3. The method according to claim 2, after the searching for corresponding location information according to the longitude and latitude information, further comprising:

determining default location information and graphic information according to the collage template identifier if the location information corresponding to the longitude and latitude information is not found, and generating corresponding graphic and textual information according to the default location information and graphic information.

4. A terminal, comprising:

a processor, and multiple instruction modules that can be executed by the processor, the multiple instruction modules including:

a first acquiring module, configured to acquire a selected image and a collage template identifier corresponding to a selected collage template, each collage template corresponding to one collage template identifier;

a second acquiring module, configured to acquire longitude and latitude information corresponding to the selected image;

a sending module, configured to send the longitude and latitude information and the collage template identifier to a server, so that the server returns corresponding graphic and textual information according to the longitude and latitude information and the collage template identifier, each collage template identifier corresponding to at least one group of graphic and textual information, and the graphic and textual information including textual information and graphic information that are related to a location, and the textual information includes textual information corresponding to a location name and textual description information related to the location name;

a receiving module, configured to receive the graphic and textual information returned by the server; and a superposition module, configured to superpose the selected image and the graphic and textual information on the selected collage template:

wherein the second acquiring module is configured to detect whether exchangeable image file (exif) information exists in the selected image, the exif information includes at least longitude and latitude information of a location at which the selected image is shot; acquire, if it is detected that exif information exists in the selected image, the exif information in the selected image, and acquire the longitude and latitude information corresponding to the selected image according to the exif information; or measure longitude and latitude information of a current location if it is detected that no exif information exists in the selected image, and use the longitude and latitude information obtained through measurement as the longitude and latitude information corresponding to the selected image.

5. A server, comprising:

a processor, and multiple instruction modules that can be executed by the processor, the multiple instruction modules including:

a receiving module, configured to receive longitude and latitude information and a collage template identifier that are acquired and sent by a terminal, the longitude and latitude information being longitude and latitude information corresponding to a selected image acquired by the terminal, and the collage template identifier being a collage template identifier corresponding to a selected collage template acquired by the terminal;

a generating module, configured to generate corresponding graphic and textual information according to the longitude and latitude information and the collage template identifier, the graphic and textual information including textual information and graphic information that are related to a location, and the textual information includes textual information corresponding to a location name and textual description information related to the location name; and a sending module, configured to send the graphic and textual information to the terminal, so that the terminal superposes the selected image and the graphic and textual information on the selected collage template;

wherein the generating module includes:

a search unit, configured to search for corresponding location information according to the longitude and latitude information; and an acquiring unit, configured to acquire, when the location information corresponding to the longitude and latitude information is found, corresponding graphic information according to the collage template identifier and the found location information; and a first generating unit, configured to generate corresponding graphic and textual information according to the found location information and the acquired corresponding graphic information.

6. The server according to claim 5, wherein the generating module further comprises:
  a determining unit, configured to determine default location information and graphic information according to the collage template identifier when the location information corresponding to the longitude and latitude information is not found; and
  a second generating unit, configured to generate corresponding graphic and textual information according to the default location information and graphic information.

\* \* \* \* \*